(12) United States Patent
Ariga et al.

(10) Patent No.: US 8,328,668 B2
(45) Date of Patent: Dec. 11, 2012

(54) VEHICLE POWER TRANSMISSION DEVICE

(75) Inventors: Michihiro Ariga, Anjo (JP); Syoichi Sayo, Toyota (JP); Ryoji Habuchi, Okazaki (JP)

(73) Assignees: Aisin AW Co., Ltd., Anjo (JP); Toyota Jidosha Kabushiki Kaisha, Toyota (JP)

( * ) Notice: Subject to any disclaimer, the term of this patent is extended or adjusted under 35 U.S.C. 154(b) by 525 days.

(21) Appl. No.: 12/318,225

(22) Filed: Dec. 23, 2008

(65) Prior Publication Data

US 2009/0165586 A1    Jul. 2, 2009

(30) Foreign Application Priority Data

Dec. 27, 2007   (JP) ................................. 2007-336068

(51) Int. Cl.
    *F16H 57/04*    (2010.01)
(52) U.S. Cl. ................ 474/1; 74/607; 74/467; 184/13.1
(58) Field of Classification Search ..... 474/1; 184/13.1, 184/11.1, 6.12; 123/196 R; 180/337
    See application file for complete search history.

(56) References Cited

U.S. PATENT DOCUMENTS

| | | | | |
|---|---|---|---|---|
| 3,625,310 A | * | 12/1971 | Herrick | 184/6.12 |
| 3,672,586 A | * | 6/1972 | Morton | 242/479.8 |
| 4,227,427 A | * | 10/1980 | Dick | 74/467 |
| 4,231,266 A | * | 11/1980 | Nishikawa et al. | 74/467 |
| 4,242,923 A | * | 1/1981 | Nishikawa et al. | 475/160 |
| 4,414,861 A | * | 11/1983 | Witt | 74/606 A |
| 4,433,593 A | * | 2/1984 | Ikemoto et al. | 74/606 R |
| 4,736,809 A | * | 4/1988 | Kumazawa | 180/339 |
| 4,871,343 A | * | 10/1989 | Hattori | 474/28 |
| 4,879,921 A | * | 11/1989 | Asada et al. | 74/467 |
| 5,404,964 A | * | 4/1995 | Zinsmeyer et al. | 184/6.12 |
| 5,472,383 A | * | 12/1995 | McKibbin | 475/159 |
| 5,509,501 A | * | 4/1996 | Damme | 184/7.4 |
| 5,601,155 A | * | 2/1997 | Gardner | 184/11.2 |

(Continued)

FOREIGN PATENT DOCUMENTS

DE    103 59 109 A1    7/2005

(Continued)

OTHER PUBLICATIONS

Jan. 5, 2012 Office Action issued in Chinese Application No. CN200880020354.5 (Partial English Translation only).

(Continued)

*Primary Examiner* — Michael Mansen
*Assistant Examiner* — Mark K Buse
(74) *Attorney, Agent, or Firm* — Oliff & Berridge, PLC

(57) ABSTRACT

A vehicle power transmission device mounted on a vehicle for transmitting power from a power generating source to an axle through a gear train accommodated in a case, including: a lubricating pump that is accommodated in the case and which is driven by the power generating source and is capable of supplying a lubricating medium to an element to be lubricated; a lubricating medium storage portion that stores the lubricating medium; a lowermost gear that is located at a lowest position in the case, and which scoops up the lubricating medium in an inner bottom of the case toward a center of the case during normal rotation of the axle without guiding the lubricating medium along an inner wall surface of the case; a partition wall; and a lubrication flow path that guides the lubricating medium scooped up by the lowermost gear to a predetermined element to be lubricated.

15 Claims, 4 Drawing Sheets

U.S. PATENT DOCUMENTS

| | | | | |
|---|---|---|---|---|
| 5,799,540 A * | 9/1998 | Diehl et al. | 74/473.37 |
| 5,833,571 A * | 11/1998 | Tsukamoto et al. | 477/44 |
| 5,910,062 A * | 6/1999 | Mizuta | 475/159 |
| 5,941,787 A * | 8/1999 | Imaida et al. | 474/18 |
| 5,961,418 A * | 10/1999 | Taniguchi et al. | 477/47 |
| 6,044,931 A * | 4/2000 | Reed et al. | 184/6.12 |
| 6,135,241 A * | 10/2000 | Ganguly et al. | 184/11.1 |
| 6,161,650 A * | 12/2000 | Ostergaard et al. | 184/13.1 |
| 6,223,858 B1 * | 5/2001 | Ubagai et al. | 184/11.2 |
| 6,332,444 B1 * | 12/2001 | Narita et al. | 123/196 R |
| 6,547,686 B1 * | 4/2003 | Thorenz | 475/159 |
| 6,634,459 B1 * | 10/2003 | Litkenhus et al. | 184/6.12 |
| 7,314,115 B2 * | 1/2008 | Ito et al. | 184/6.5 |
| 7,343,833 B2 * | 3/2008 | Matsushima | 74/607 |
| 7,461,720 B2 * | 12/2008 | Min | 184/6.12 |
| 7,694,597 B2 * | 4/2010 | Nishi et al. | 74/325 |
| 7,699,738 B2 * | 4/2010 | Oomura | 475/114 |
| 7,712,581 B2 * | 5/2010 | Billings et al. | 184/13.1 |
| 7,878,304 B2 * | 2/2011 | Reis et al. | 184/6.12 |
| 2006/0048600 A1 * | 3/2006 | Taguchi et al. | 74/607 |
| 2007/0144283 A1 * | 6/2007 | Hasegawa et al. | 74/325 |
| 2007/0272195 A1 * | 11/2007 | Keyaki et al. | 123/196 R |
| 2008/0041179 A1 * | 2/2008 | Yasui et al. | 74/467 |
| 2010/0242895 A1 * | 9/2010 | Takiguchi et al. | 123/196 R |

FOREIGN PATENT DOCUMENTS

| | | |
|---|---|---|
| FR | 1 385 562 | 12/1963 |
| JP | U-53-106571 | 8/1978 |
| JP | A-60-229824 | 11/1985 |
| JP | U-5-14728 | 2/1993 |
| JP | A-07-27207 | 1/1995 |
| JP | A-10-26216 | 1/1998 |
| JP | A-10-26217 | 1/1998 |
| JP | A-10-252871 | 9/1998 |
| JP | A-2004-36633 | 2/2004 |
| JP | A-2004-183714 | 7/2004 |
| JP | A-2005-201316 | 7/2005 |
| JP | A-2006-83934 | 3/2006 |

OTHER PUBLICATIONS

International Search Report issued in International Application No. PCT/JP2008/073248 dated Mar. 24, 2009 (with translation).

Office Action issued in German Application No. 11 2008 001 617.8 dated May 3, 2012.

* cited by examiner

F I G . 1
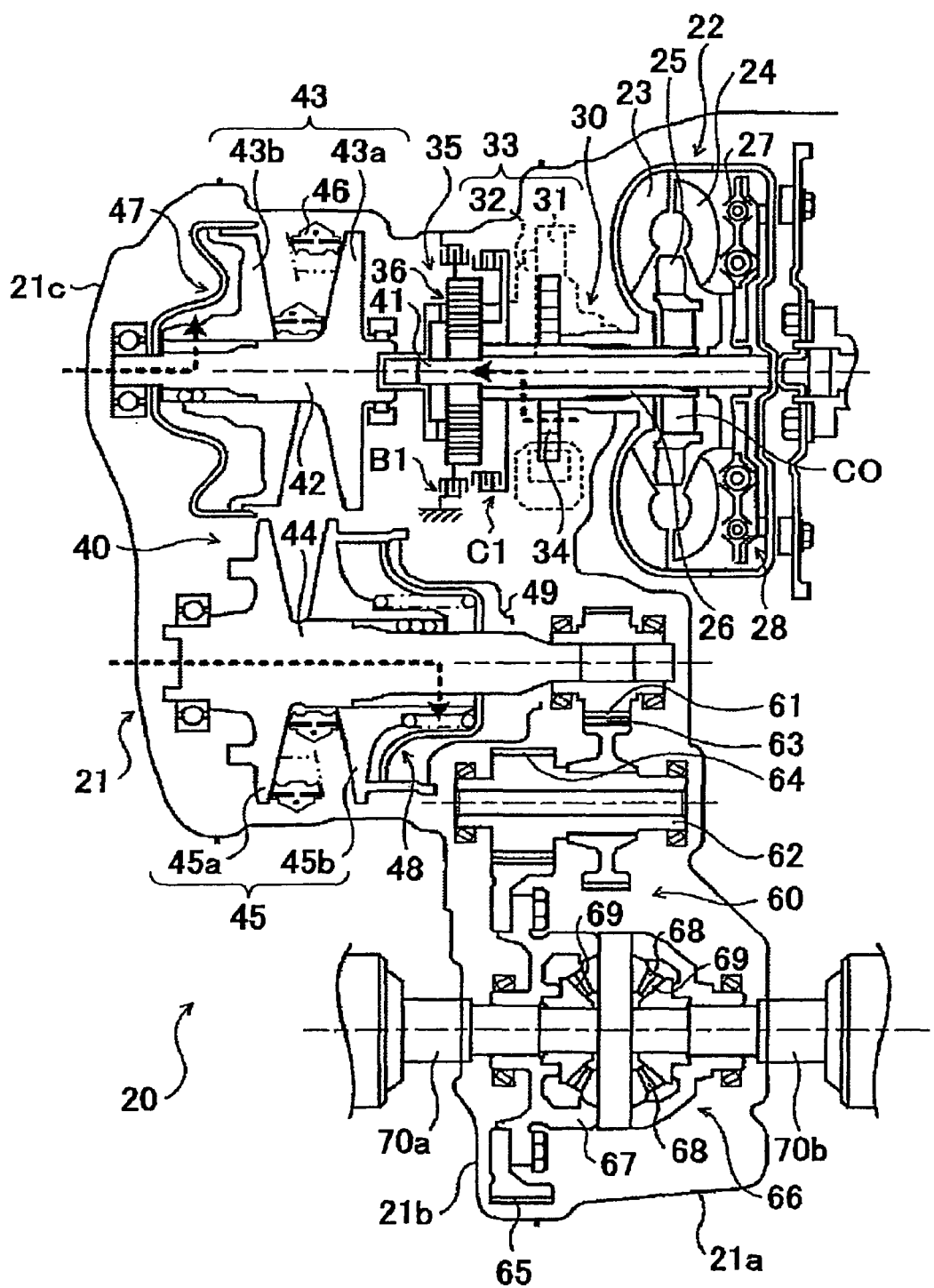

VEHICLE POWER TRANSMISSION DEVICE

INCORPORATION BY REFERENCE

The disclosure of Japanese Patent Application No. 2007-336068 filed on Dec. 27, 2007 including the specification, drawings and abstract is incorporated herein by reference in its entirety.

BACKGROUND

The present invention relates to a vehicle power transmission device.

A vehicle power transmission device is known in the art that includes a continuously variable transmission unit, a differential mechanism (differential gear) and the like, and is structured so as to scoop up a lubricating oil by a differential ring gear (final driven gear) rotating together with wheels and to supply the scooped-up lubricating oil to a predetermined element to be lubricated by gravity (e.g., see Japanese Patent Application Publication No. JP-A-2004-183714). Although an oil pump cannot be operated during towing of a vehicle, the vehicle power transmission device mounted on the vehicle enables a relatively large amount of lubricating oil to be reliably guided to an oil receiver by gears rotating with the wheels and by gravity, whereby an element to be lubricated can be lubricated.

In another vehicle power transmission device known in the art, a lower part of a power transmission mechanism chamber in a housing is partitioned by a weir into a bottomed differential chamber accommodating a differential mechanism and an oil pan chamber communicating with an oil pan (e.g., see Japanese Patent Application Publication No. JP-A-2004-36633). In this vehicle power transmission device, an opening extending in the direction perpendicular to an axial direction of the differential mechanism is formed in the weir partitioning the differential chamber and the oil pan chamber. The differential chamber and the oil pan chamber communicate with each other through this opening.

Further, Japanese Patent Application Publication No. JP-A-2004-36633 describes that a one-way valve is provided in the opening formed in the weir in order to prevent lubricating oil from flowing out of the oil pan chamber into the differential chamber (e.g., see FIG. 6 in JP-A-2004-36633).

SUMMARY

The above known vehicle power transmission devices are applied to a front-wheel drive vehicle, and are mounted on a vehicle so that the differential ring gear (differential mechanism) is located rearward of a primary shaft of the continuously variable transmission unit in a longitudinal direction of the vehicle. It is therefore not easy to further increase the length of the wheel base of the vehicle by using the known vehicle power transmission devices. In order to extend the vehicle wheel base, it is preferable to use a vehicle power transmission device having a mirror-inverted structure (a structure obtained by inverting the known structure in the longitudinal direction of the vehicle) with respect to the known structure. However, in the vehicle power transmission device having the mirror-inverted structure with respect to the known structure, the direction in which the differential ring gear scoops up lubricating oil and the like are different from those of the known vehicle power transmission devices. Accordingly, if no measures are taken, most of the lubricating oil scooped up by the differential ring gear may flow into an oil pan, and the lubricating oil may not be able to be sufficiently supplied to an element to be lubricated due to, for example, operation of the gears rotating together with the wheels during towing of the vehicle.

It is a primary object of the present invention to provide a vehicle power transmission device capable of implementing a longer wheel base of a vehicle and capable of desirably lubricating a predetermined element even during towing of the vehicle. The present invention can also achieve various other advantages The vehicle power transmission device according to the present invention is a vehicle power transmission device mounted on a vehicle for transmitting power from a power generating source to an axle through a gear train accommodated in a case. The vehicle power transmission device includes: a lubricating pump which is accommodated in the case and which is driven by the power generating source and is capable of supplying a lubricating medium to an element to be lubricated; a lubricating medium storage portion which stores the lubricating medium; a lowermost gear which is located at a lowest position in the case among gears included in the gear train when the power transmission device is mounted on the vehicle, and which scoops up the lubricating medium in an inner bottom of the case toward a center of the case during normal rotation of the axle without guiding the lubricating medium along an inner wall surface of the case; a partition wall which extends upward from the inner bottom of the case and surrounds a part of an outer periphery of the lowermost gear on a center side of the case; and a lubrication flow path for guiding the lubricating medium scooped up by the lowermost gear and carried by the gear train to a predetermined element to be lubricated.

BRIEF DESCRIPTION OF THE DRAWINGS

Exemplary embodiments of the invention will now be described with reference to the accompanying drawings, wherein:

FIG. 1 is a schematic structural diagram of a power transmission device according to an embodiment of the present invention;

DETAILED DESCRIPTION OF EMBODIMENTS

Figure 2:
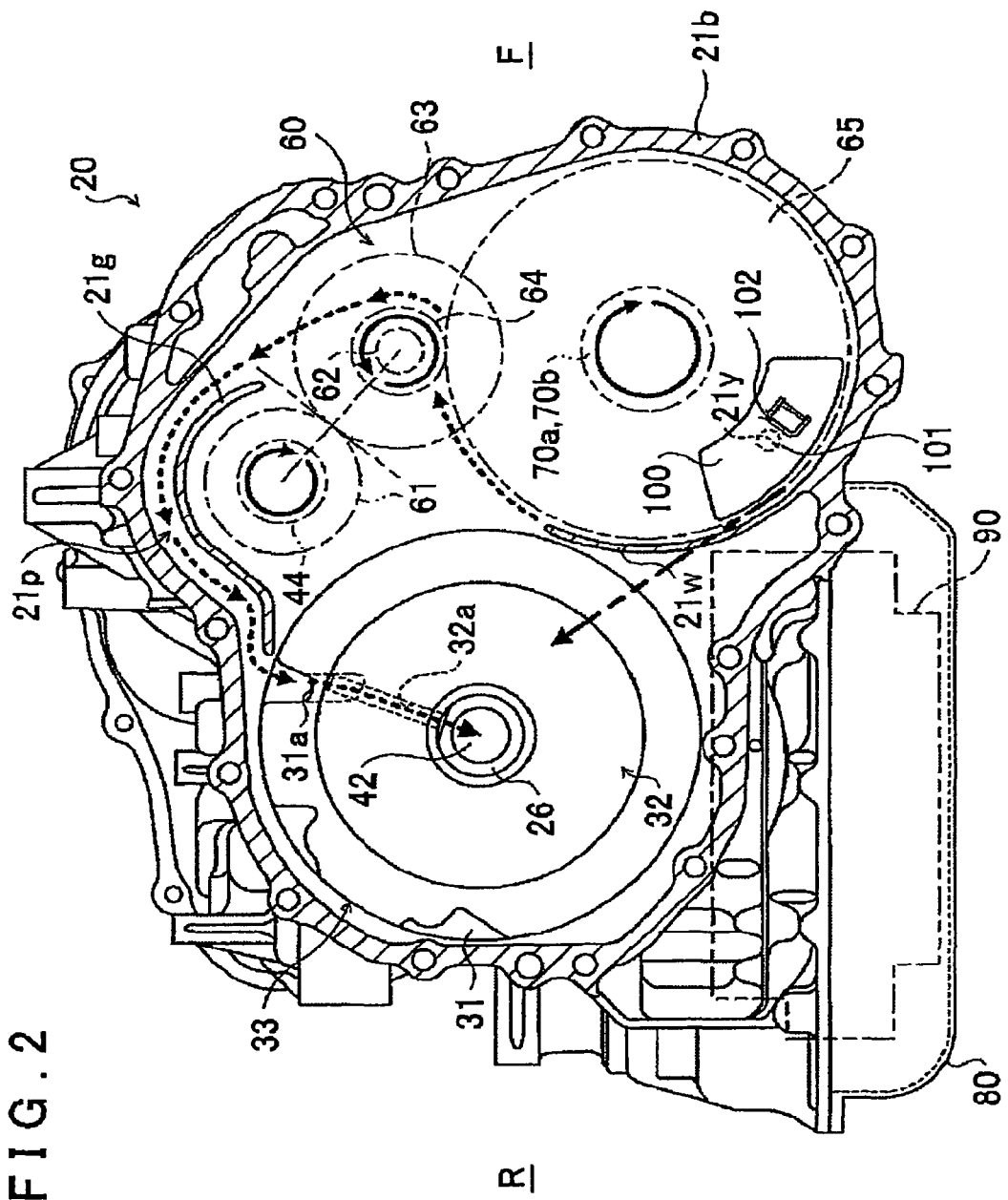
FIG. 2 is a partial cross-sectional view showing the inside of a transaxle case of the power transmission device of the embodiment.

Embodiments according to the present invention will be described below with reference to the drawings. FIG. 1 is a schematic structural diagram showing a power transmission device (transmission) according to an embodiment of the present invention. A power transmission device 20 shown in FIG. 1 is applied to a front-wheel drive vehicle and transmits power from a not-shown engine mounted in a front part of the vehicle to right and left front wheels. The power transmission device 20 includes a case 21 formed by integrally connecting a converter housing 21a, a transaxle case 21b, and a rear cover 21c. The power transmission device 20 further includes a torque converter 22, an oil pump 30, a forward/backward travel switching unit 35, a belt-type continuously variable transmission unit (hereinafter, referred to as "CVT") 40, a gear mechanism (gear train) 60, a differential mechanism (differential gear) 66, and the like, which are accommodated in the case 21. In the vehicle having the power transmission device 20 mounted thereon, power from the engine is transmitted to the CVT 40 through the torque converter 22 and the forward/backward travel switching unit 35. The power is then continuously shifted by the CVT 40 and transmitted to the right and left front wheels through the gear mechanism 60 and the differential mechanism 66.

The torque converter 22 is structured as a hydrodynamic torque converter having a lock-up clutch and is accommodated in the converter housing 21a. As shown in FIG. 1, the torque converter 22 includes a pump impeller 23 connected to a crankshaft of the not-shown engine, a turbine runner 24 fixed to an input shaft 41 of the CVT 40, a stator 25 provided inside the pump impeller 23 and the turbine runner 24, a one-way clutch CO for limiting the rotation direction of the stator 25 to one direction, a lock-up clutch 28 having a damper mechanism 27, and the like. The torque converter 22 operates as a torque amplifier when the rotation speed difference between the pump impeller 23 and the turbine runner 24 is large, and operates as a fluid coupling when the rotation speed difference becomes small. When the vehicle speed reaches a predetermined value after starting of the vehicle, the lock-up clutch 28 locks the pump impeller 23 and the turbine runner 24, whereby the power from the engine is mechanically and directly transmitted to the input shaft 41. At this time, the damper mechanism 27 absorbs variation in torque transmitted to the input shaft 41.

The oil pump 30 is structured as a so-called gear pump including a pump assembly 33 and an external gear 34. The pump assembly 33 is formed by a pump body 31 and a pump cover 32 which are provided between the torque converter 22 and the forward/backward travel switching unit 35. The pump body 31 and the pump cover 32 are fixed to the converter housing 21a and the transaxle case 21b. The external gear 34 is connected to the pump impeller 23 through a hub and forms a crescent together with not-shown internal teeth formed on the pump body 31.

With this structure, when the external gear 34 is rotated by the power from the engine, the oil pump 30 sucks a working fluid (ATF) stored in an oil pan 80 (see FIG. 2), and the pressure of the sucked working fluid is increased. An oil pressure (line pressure) required by the CVT 40 and the forward/backward travel switching unit 35 can therefore be generated and the working fluid as a lubricating medium can be supplied to elements to be lubricated, such as predetermined parts like the CVT 40, the one-way clutch CO, and the forward/backward travel switching unit 35, and various bearings.

The forward/backward travel switching unit 35 is accommodated in the transaxle case 21b and includes a double-pinion type planetary gear mechanism 36, a hydraulic brake B1, and a hydraulic clutch C1. The hydraulic brake B1 and the hydraulic clutch C1 operate by using the working fluid from the oil pump 30. The planetary gear mechanism 36 includes a sun gear, which is fixed to the input shaft 41 of the CVT 40, a ring gear, and a carrier. The carrier supports a pinion gear meshing with the sun gear and a pinion gear meshing with the ring gear and is connected to a primary shaft 42 of the CVT 40. The brake B1 is capable of both fixing the ring gear of the planetary gear mechanism 36 to the transaxle case 21b and making the ring gear of the planetary gear mechanism 36 rotatable. The clutch C1 is capable of both fixing the carrier of the planetary gear mechanism 36 to the input shaft 41 (sun gear) and making the carrier of the planetary gear mechanism 36 rotatable.

With this structure, by turning off the brake B1 and turning on the clutch C1, the power transmitted from the torque converter 22 to the input shaft 41 is directly transmitted to the primary shaft 42 of the CVT 40, thereby enabling the vehicle to travel forward. By turning on the brake B1 and turning off the clutch C1, rotation of the input shaft 41 is reversed and the reversed rotation is transmitted to the primary shaft 42 of the CVT 40, thereby enabling the vehicle to travel backward. Moreover, by turning off both the brake B1 and the clutch C1, the input shaft 41 and the primary shaft 42 can be disconnected from each other.

The CVT 40 is accommodated in the transaxle case 21b and the rear cover 21c. The CVT 40 includes the primary shaft 42 as a driving-side rotating shaft extending coaxially with the input shaft 41, a primary pulley 43 provided on the primary shaft 42, a secondary shaft (output shaft) 44 as a driven-side rotating shaft extending in parallel with the primary shaft 42, a secondary pulley 45 provided on the secondary shaft 44, and a belt 46 wound around the primary pulley 43 and the secondary pulley 45. The primary pulley 43 includes a fixed sheave 43a formed integrally with the primary shaft 42 and a movable sheave 43b axially slidably supported by the primary shaft 42 through a ball spline and the like. A hydraulic cylinder (hydraulic actuator) 47 for changing the groove width of the primary pulley 43 is formed behind the movable sheave 43b of the primary pulley 43. The secondary pulley 45 includes a fixed sheave 45a formed integrally with the secondary shaft 44 and a movable sheave 45b axially slidably supported by the secondary shaft 44 through a ball spline, a return spring and the like. A hydraulic cylinder (hydraulic actuator) 48 for changing the groove width of the secondary pulley 45 is formed behind the movable sheave 45b of the secondary pulley 45.

Moreover, in the CVT 40 of the embodiment, a cancel plate 49 defining a cancel chamber is provided on the secondary pulley 45. The cancel plate 49 is located behind the hydraulic cylinder 48. By introducing a working fluid into the cancel chamber defined by the cancel plate 49 and the like, a centrifugal oil pressure applied to the hydraulic cylinder 48 can be cancelled by a centrifugal oil pressure applied to the working fluid in the cancel chamber. The pressure of the working fluid is increased by the oil pump 30 and then regulated by a hydraulic circuit (valve body) 90 (see FIG. 2) including a plurality of control valves, and the pressure-regulated working fluid thus obtained is supplied to the hydraulic cylinder 47 of the primary pulley 43, the hydraulic cylinder 48 of the secondary pulley 45, and the cancel chamber. Thus, the groove widths of the primary pulley 43 and the secondary pulley 45 are changed, whereby the power input from the input shaft 41 to the primary shaft 42 can be continuously shifted and output to the secondary shaft 44.

The gear mechanism 60 is accommodated in the converter housing 21a and the transaxle case 21b. The gear mechanism 60 includes a counter drive gear 61 which is fixed to one end of the secondary shaft 44, a counter driven gear 63 which is fixed to one end side of a counter shaft 62 extending in parallel with the secondary shaft 44 and meshes with the counter drive gear 61, a drive pinion gear (final drive gear) 64 which is fixed to the other end side of the counter shaft 62, and a differential ring gear (final driven gear) 65 which meshes with the drive pinion gear 64 and is connected to the differential mechanism 66. As shown in FIG. 2, when the power transmission device 20 is mounted on a vehicle, the differential ring gear 65 is located at the lowest position in the case 21 among the gears included in the gear mechanism 60, and the counter drive gear 61 is located at the highest position in the case 21 among the gears included in the gear mechanism 60. As shown in FIG. 1, the differential mechanism 66 includes a differential case 67 rotatably supported in the case 21 and connected to the differential ring gear 65, a pair of pinion mate gears (bevel gears)

68 fixed to a shaft rotatably supported by the differential case 67, and a pair of side gears 69 respectively meshing with the pinion mate gears 68. Left and right differential shafts 70a, 70b as a front wheel axle are respectively fixed to the side gears 69.

The power transmission device 20 of the embodiment has a mirror-inverted structure with respect to the structure of a typical power transmission device for a front-wheel drive vehicle. In other words, the typical power transmission device for a front-wheel drive vehicle is structured so as to be mounted on a vehicle with a differential ring gear (differential mechanism) being located rearward of a primary shaft of a CVT in a longitudinal direction of the vehicle. As shown in FIG. 2, on the other hand, the power transmission device 20 of the embodiment is structured so as to be mounted on a vehicle with the differential ring gear 65 (differential mechanism 66) being located forward of the primary shaft 42 of the CVT 40 in the longitudinal direction of the vehicle. This structure enables the wheel base, i.e., the distance between front and rear axles, to be easily extended in a vehicle having the power transmission device 20 mounted thereon. As a result, a passenger compartment, a luggage compartment, and the like can be enlarged. Note that, in FIG. 2, the right-hand side in the figure indicates the front (F) side of the vehicle and the left-hand side in the figure indicates the rear (R) side of the vehicle.

When a vehicle having the power transmission device 20 of the above structure mounted thereon is traveling, the oil pump 30 is driven by the power from the engine. Therefore, the working fluid (ATF) sucked by the oil pump 30 from the oil pan 80 is supplied as a lubricating medium to parts requiring lubrication (elements to be lubricated) such as the torque converter 22, the forward/backward travel switching unit 35, and the CVT 40. On the other hand, when the vehicle having the power transmission device 20 is towed, with its four wheels mounted, by another vehicle in the case of a breakdown or the like, the engine is stopped and therefore the oil pump 30 cannot be driven. Accordingly, the working fluid as a lubricating medium cannot be supplied to the elements to be lubricated by using the oil pump 30. Moreover, the pressure of the working fluid cannot be raised to the line pressure by the oil pump 30 during towing of the vehicle. As a result, both the brake B1 and the clutch C1 of the forward/backward travel switching unit 35 are disengaged. At the same time, the groove width of the primary pulley 43 is maximized and the groove width of the secondary pulley 45 is minimized due to the operation of the return spring of the secondary pulley 45 and the like. In other words, the effective radius of the primary pulley 43 is minimized and the effective radius of the secondary pulley 45 is maximized. As a result, the CVT 40 is brought into the most underdrive state. Accordingly, when the vehicle is towed, the primary shaft 42 of the CVT 40 is rendered in an overdrive state with respect to the differential shafts 70a, 70b as an axle and rotates at a relatively high speed. Especially the forward/backward travel switching unit 35 connected to the primary shaft 42 therefore needs to be lubricated sufficiently.

Figure 3:
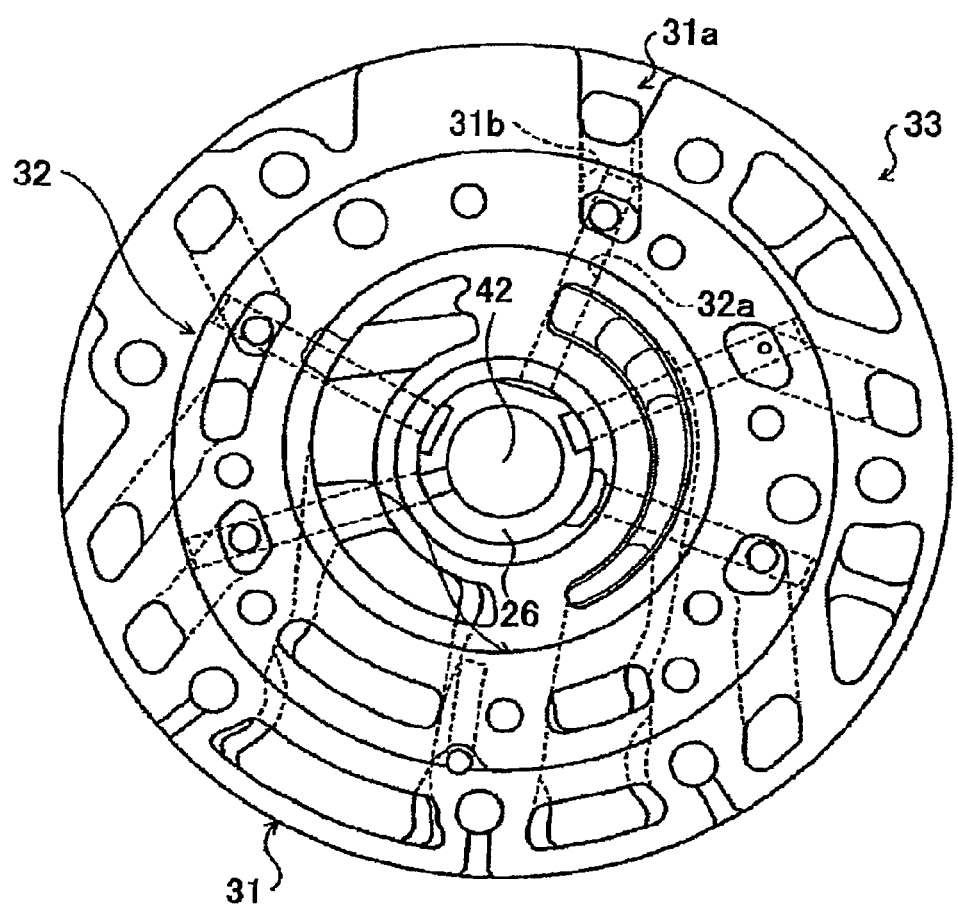
FIG. 3 is a schematic structural diagram showing a pump assembly formed by a pump body and a pump cover.

As shown in FIGS. 2 and 3, in the power transmission device 20 of the embodiment, a flow path for supplying the working fluid as a lubricating medium to the forward/backward travel switching unit 35 is formed in the pump body 31 and the pump cover 32 of the oil pump 30. More specifically, the pump body 31 has a hole 31a formed so as to be located in a top part of the pump body 31 when the power transmission device 20 is mounted on a vehicle, and the pump cover 32 has a lubrication flow path 32a extending from the outer periphery toward the center. The hole 31a of the pump body 31 is formed so that its opening area decreases from the outer periphery toward the center. The hole 31a of the pump body 31 has an approximately funnel-shaped inner peripheral surface. The pump cover 32 is disposed in the case 21 so that an outer peripheral end of the lubrication flow path 32a is located forward in the longitudinal direction of the vehicle and a central end of the lubrication flow path 32a is located rearward in the longitudinal direction of the vehicle when the power transmission device 20 is mounted on the vehicle. The lubrication flow path 32a is tilted downward toward the rear of the vehicle. The lubrication flow path 32a communicates with the hole 31a serving as a working fluid inlet through a groove 31b. The groove 31b is formed on the surface on the pump cover 32 side of the pump body 31. The lubrication flow path 32a communicates also with parts around the gears, the brake B1, and the clutch C1 of the forward/backward travel switching unit 35 through grooves and holes formed in a stator sleeve 26 supporting the one-way clutch CO and the like, through a gap between the stator sleeve 26 and the input shaft 41, and the like.

Accordingly, when the vehicle having the power transmission device 20 mounted thereon is towed, the working fluid is scooped up from the inner bottom of the case 21 (in the embodiment, the converter housing 21a and the transaxle case 21b) by the differential ring gear 65 located at the lowest position in the case 21 among the gears included in the gear mechanism 60. The working fluid thus scooped up is then guided to the hole 31a of the pump body 31 by the gear mechanism 60. As a result, the working fluid as a lubricating medium can be supplied by gravity through the hole 31a, the groove 31b, the lubrication flow path 32a of the pump cover 32, and the like to the elements to be lubricated such as the gears, the brake B1, and the clutch C1 of the forward/backward travel switching unit 35.

It should be noted that, as described above, the power transmission device 20 of the embodiment has a mirror-inverted structure with respect to the structure of a typical power transmission device for a front-wheel drive vehicle in order to implement a longer vehicle wheel base. Therefore, when the differential shafts 70a, 70b rotate normally and the vehicle travels forward, the differential ring gear 65 located at the lowest position scoops up the working fluid accumulated in the inner bottom of the case 21 toward the center of the case 21 as shown by two-dot chain arrow in FIG. 2 without guiding the working fluid along the inner wall surface of the transaxle case 21b. If no measures are taken, the working fluid thus scooped up by the differential ring gear 65 will not be carried by the gear mechanism 60 but will flow into the oil pan 80 which is attached to the case 21 at a position rearward of the differential ring gear 65 in the longitudinal direction of the vehicle and under the CVT 40 in the embodiment. As a result, when the vehicle is towed, the working fluid as a lubricating medium may not be sufficiently supplied to the forward/backward travel switching unit 35 to be lubricated, or there may not be enough working fluid in the inner bottom of the case 21 to be scooped up by the differential ring gear 65.

In view of the above problems, the power transmission device 20 of the embodiment has a partition wall 21w. The partition wall 21w is extended upward from the inner bottom of the case 21 in the transaxle case 21b, and surrounds a part of the outer periphery of the differential ring gear 65 on the center side of the case 21. As shown in FIG. 2, the partition wall 21w is formed to surround at least the lower half of the outer periphery of the differential ring gear 65 on the center side of the case 21. More specifically, the partition wall 21w is formed so as to surround at least the lower quarter of the outer periphery of the differential ring gear 65 on the vehicle rearward side (the left-hand side in the figure). In the embodiment, as shown in FIG. 2, an upper end of the partition wall 21w is positioned so as to guide the working fluid to a meshing part between the differential ring gear 65 and the drive pinion gear 64 serving as an intermediate gear between the differential ring gear 65 and the counter drive gear 61. The width of the partition wall 21w, that is, the length of the partition wall 21w in the direction parallel to the differential shafts 70a, 70b, the counter shaft 62, and the like, may be the same as the thickness of the differential ring gear 65.

In the embodiment, however, the width of the partition wall 21w is the same as the inner width of the case 21 (in the embodiment, about the same length as that of the counter shaft 62) so that a required and sufficient amount of working fluid can be stored in the inner bottom of the case 21 around the differential ring gear 65. The partition wall 21w thus defines the respective inner wall surfaces of the converter housing 21a and the transaxle case 21b and an accommodating portion of the differential ring gear 65 and the differential mechanism 66. By forming such a partition wall 21w in the converter housing 21a and the transaxle case 21b, the working fluid that is scooped up by the differential ring gear 65 can be more desirably directed to the meshing part between the differential ring gear 65 and the drive pinion gear 64 serving as an intermediate gear. Note that in the case where the partition wall 21w is integrally molded with the inner bottom portion of the case 21 or the like by, for example, casting, it is preferable to form the partition wall 21w continuously with not-shown ribs formed on the inner surface of a sidewall portion of the transaxle case 21b in order to ensure the strength of the partition wall 21w.

Figure 4:
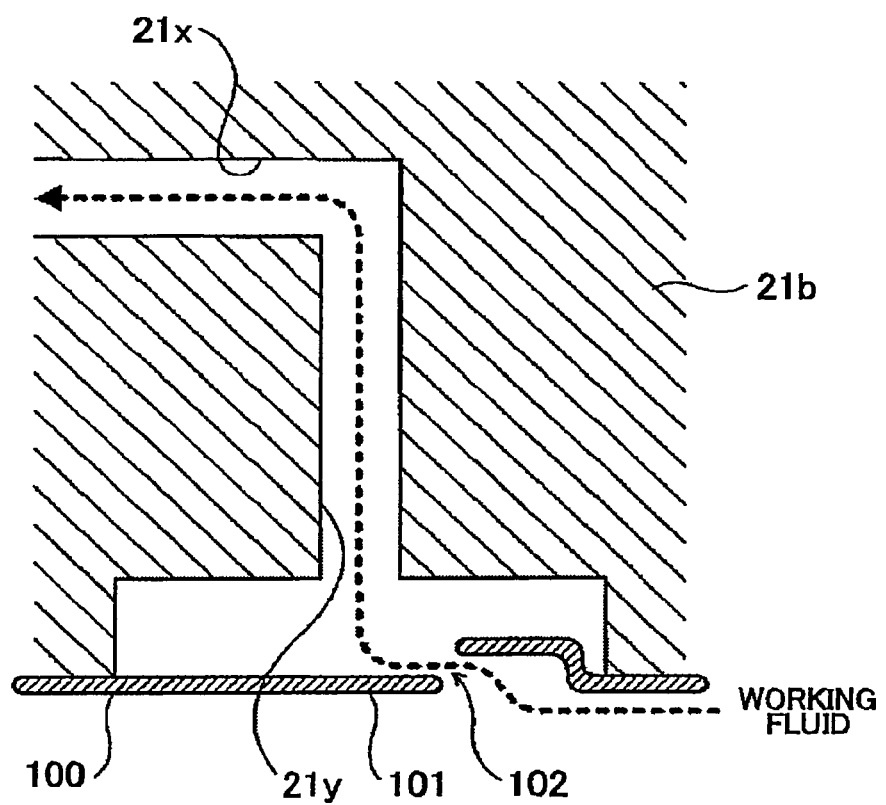
FIG. 4 is a cross-sectional view showing a sidewall portion of the transaxle case.

In the embodiment, the accommodating portion of the differential ring gear 65 etc., which is defined by the partition wall 21w and the like, communicates with the oil pan 80 through a communicating path including a flow path extending in an axial direction of the differential shafts 70a, 70b, the differential ring gear 65, and the like. More specifically, as shown in FIG. 4, holes 21y, 21x are formed in a sidewall portion of the converter housing 21a. The hole 21y extends in a width direction of the vehicle in parallel with the differential shafts 70a, 70b and the like, that is, along the axial direction of the differential ring gear 65. The hole 21x extends continuously with the hole 21y in a direction perpendicular to the differential shafts 70a, 70b and the like (e.g., in the longitudinal direction of the vehicle), and communicates with the inside of the oil pan 80 directly or through not-shown another flow path. A metal plate (shielding member) 100 having a shielding portion 101 and a slit 102 as shown in FIGS. 2 and 4 is fixed to the sidewall portion of the converter housing 21a.

As can be seen from FIGS. 2 and 4, the shielding portion 101 and the slit 102 of the plate 100 are formed by forming, for example, a substantially U-shaped or C-shaped cut in a metal plate and by bending a portion inside the cut so that the portion inside the cut is recessed with respect to a surrounding portion. The plate 100 is fixed to the sidewall portion of the converter housing 21a so that a base end of the bent portion inside the cut is located forward in the longitudinal direction of the vehicle and so that the bent portion does not overlap the hole 21y. As a result, a portion of the plate 100 located rearward of the bent portion in the longitudinal direction of the vehicle functions as the shielding portion 101. The shielding portion 101 prevents the working fluid from entering the hole 21y from the direction along the axial direction (the width direction of the vehicle) of the differential ring gear 65 (differential shafts 70a, 70b). The working fluid thus enters the hole 21y mainly from the direction along the rotation direction of the differential gear 65 through the slit 102, as shown by dotted line in FIG. 4.

In the power transmission device 20 of the embodiment, as shown in FIG. 2, the differential ring gear 65 located at the lowest position and the counter drive gear 61 located at the highest position rotate in the same direction. Accordingly, if no measures are taken, the working fluid, which is scooped up by the differential ring gear 65, guided by the partition wall 21w to the meshing part between the drive pinion gear 64 and the differential ring gear 65, and carried upward by the drive pinion gear 64, may be guided to a meshing part between the counter driven gear 63 as an intermediate gear and the counter drive gear 61 by rotation of the counter drive gear 61 and may drop into the oil pan 80 without being guided further upward.

In view of the above problem, the power transmission device 20 of the embodiment has a guide wall 21g in the transaxle case 21b. The guide wall 21g surrounds a part of the outer periphery of the counter drive gear 61 located at the highest position. The guide wall 21g guides the working fluid scooped up by the differential ring gear 65 and carried by the gear mechanism 60, that is, carried by the drive pinion gear 64 and the differential ring gear 65, into the hole 31a of the pump body 31 provided as an inlet of the lubrication flow path 32a.

In the embodiment, as shown in FIG. 2, the guide wall 21g is extended from the inner surface of the sidewall portion of the transaxle case 21b so as to surround approximately the upper half of the outer periphery of the counter drive gear 61 located at the highest position. The guide wall 21g defines, together with an upper inner wall surface of the transaxle case 21b, a circular-arc shaped flow path 21p facing the hole 31a. The guide wall 21g has an approximately horizontally extended end on the hole 31a side so that the working fluid from the flow path 21p can be appropriately introduced into the hole 31a while accumulating the working fluid as appropriate.

Moreover, the other end of the guide wall 21g located opposite to the hole 31a is positioned so as to receive the working fluid carried by the differential ring gear 65 and the drive pinion gear 64 and to suppress dropping of the working fluid into the meshing part between the counter drive gear 61 and the counter driven gear 63.

In the power transmission device 20 of the embodiment, as shown by dotted line in FIG. 2, the working fluid scooped up by the differential ring gear 65 can thus be guided to the meshing part between the drive pinion gear 64 and the differential ring gear 65 by the partition wall 21w. The working fluid carried upward by the drive pinion gear 64 can then be guided to the flow path 21p defined by the guide wall 21g and the upper inner wall surface of the transaxle case 21b. The working fluid thus entering the fluid path 21p can be desirably guided into the hole 31a, which is an inlet of the lubrication flow path 32a, by gravity without being affected by rotation of the counter drive gear 61.

Note that, in the embodiment, the guide wall 21g is structured as a continuous member. However, the present invention is not limited to this, and the guide wall 21g may alternatively be divided into a plurality of parts such as a part surrounding the counter drive gear 61 and a part forming an oil reservoir. Alternatively, the guide wall 21g may be structured so as to surround a lower part of the outer periphery of the counter drive gear 61 from a position near the meshing part between the counter drive gear 61 located in the highest position and the counter driven gear 63 as an intermediate gear to a position near the hole 31a as an inlet of the lubrication flow path 32a.

In this case, the guide wall 21g defines, together with the outer periphery of the counter drive gear 61 and the upper inner wall surface of the case 21, a flow path facing the hole 31a. When such a guide wall 21g is used, the working fluid scooped up by the differential ring gear 65 is guided by the partition wall 21w to the meshing part between the drive pinion gear 64 and the differential ring gear 65. The working fluid is then guided by the drive pinion gear 64 as an intermediate gear into the fluid path defined by the guide wall 21g through the meshing part between the counter drive gear 61 and the counter driven gear 63 as an intermediate gear. The working fluid thus guided onto the guide wall 21g (the fluid path) can be desirably guided into the hole 31a as an inlet of the lubrication flow path 32a by utilizing rotation of the counter drive gear 61 (by scooping up the working fluid with the counter drive gear 61).

As has been described above, the power transmission device 20 of the embodiment has the differential ring gear 65 which is located at the lowest position in the case 21 among the gears included in the gear mechanism 60 when the power transmission device 20 is mounted on the vehicle. When the differential shafts 70a, 70b rotate normally, the differential ring gear 65 scoops up the working fluid in the inner bottom of the case 21 toward the center of the case 21 without guiding the working fluid along the inner wall surface of the case 21. The power transmission device 20 has a mirror-inverted structure with respect to the structure of a typical power transmission device for a front-wheel drive vehicle. Accordingly, in a vehicle having the power transmission device 20 mounted thereon, the primary shaft 42 of the CVT 40 is located rearward of the differential ring gear 65 and the differential mechanism 66 in the longitudinal direction of the vehicle. Therefore, the wheel base can be easily extended.

Moreover, the power transmission device 20 has the partition wall 21w that is extended upward from the inner bottom of the case 21 and surrounds a part of the outer periphery of the differential ring gear 65 located at the lowest position on the center side of the case 21. The partition wall 21w enables a sufficient amount of working fluid to be present around the differential ring gear 65 located at the lowest position. The partition wall 21w also enables the working fluid scooped up by the differential ring gear 65 to be directed to the gear mechanism 60, that is, the meshing part between the differential ring gear 65 and the drive pinion gear 64 as an intermediate gear. As a result, a relatively large amount of working fluid can be guided to the lubrication flow path 32a and supplied to the forward/backward travel switching unit 35 to be lubricated.

Accordingly, in a front-wheel drive vehicle having the power transmission device 20 of the embodiment mounted thereon, the wheel base can be easily extended and a required and sufficient amount of working fluid can be supplied to the forward/backward travel switching unit 35 even when the vehicle is towed during which the working fluid as a lubricating medium cannot be supplied to the forward/backward travel switching unit 35 by using the oil pump 30. As a result, in the vehicle having the power transmission device 20 mounted thereon, the forward/backward travel switching unit 35 can be desirably lubricated with the working fluid from the lubrication flow path 32a even if the primary shaft 42 of the CVT 40 is brought into an overdrive state with respect to the differential shafts 70a, 70b as an axle and rotates at a relatively high speed during towing of the vehicle. Therefore, towing of the vehicle having the power transmission device 20 mounted thereon can be performed desirably.

Further, in the embodiment, the partition wall 21w is formed so as to surround at least the lower half of the outer periphery of the differential ring gear 65 on the center side of the case 21. In other words, the partition wall 21w is formed so as to surround at least the lower quarter of the outer periphery of the differential ring gear 65 on the vehicle rearward side. The upper end of the partition wall 21w is positioned so that the working fluid scooped up by the differential ring gear 65 is guided to the meshing part between the differential ring gear 65 and the drive pinion gear 64 as an intermediate gear. The working fluid that is scooped up by the differential ring gear 65 can thus be more desirably directed to the meshing part between the differential ring gear 65 and the drive pinion gear 64 as an intermediate gear.

Moreover, in the power transmission device 20 of the embodiment, the accommodating portion of the differential ring gear 65 and the differential mechanism 66, which is defined by the inner wall surface (inner bottom) of the case 21 and the partition wall 21w, communicates with the oil pan 80 through the communicating path which includes the hole 21y as a flow path extending along the axial direction of the differential ring gear 65. Since the communicating path that enables communication between the accommodating portion of the differential ring gear 65 etc. and the oil pan 80 includes the hole 21y as a flow path extending along the axial direction of the differential ring gear 65, the working fluid as a lubricating medium is less likely to flow between the accommodating portion of the differential ring gear 65 etc. and the oil pan 80, as compared to the case where the accommodating portion of the differential ring gear 65 etc. and the oil pan 80 are communicated through an opening extending in the direction perpendicular to the axial direction of the differential ring gear 65. Thus, the structure of the embodiment prevents an excessive amount of working fluid from flowing between the accommodating portion of the differential ring gear 65 etc. and the oil pan 80, whereby a more appropriate amount of working fluid can be stored in the accommodating portion of the differential ring gear 65 etc. and in the oil pan 80.

In the embodiment, the plate 100 is fixed to the sidewall portion of the converter housing 21a. The plate 100 has the shielding portion 101 for preventing the working fluid from entering the hole 21y from the direction along the axial direction of the differential ring gear 65. This structure enables a more appropriate amount of working fluid to flow between the accommodating portion of the differential ring gear 65 etc. and the oil pan 80, while preventing an excessive amount of working fluid from entering the accommodating portion of the differential ring gear 65 etc. from the oil pan 80 in case of, for example, sudden braking of a vehicle having the power transmission device 20 mounted thereon. As a result, a required and sufficient amount of working fluid can be stored in the accommodating portion of the differential ring gear 65 etc. while suppressing increase in stirring resistance resulting from an excessive amount of working fluid being stored in the accommodating portion.

Although the embodiment of the present invention has been described above using an exemplary embodiment, the present invention is not limited to the above-described embodiment, and it should be understood that various modifications could be made without departing from the spirit of the present invention.

The present invention can be used in, for example, the manufacturing industry of vehicle power transmission devices.

According to an exemplary aspect of the invention, the vehicle power transmission device includes the lowermost gear which is located at the lowest position in the case among the gears included in the gear train when the power transmission device is mounted on the vehicle, and which scoops up the lubricating medium in the inner bottom of the case toward the center of the case during normal rotation of the axle without guiding the lubricating medium along the inner wall surface of the case. The vehicle power transmission device has a mirror-inverted structure with respect to the structure of a known vehicle power transmission device. The wheel base can therefore be easily extended in a vehicle having this vehicle power transmission device mounted thereon. However, in the case where the lowermost gear is structured to scoop up the lubricating medium in the inner bottom of the case toward the center of the case during normal rotation of the axle without guiding the lubricating medium along the inner wall surface of the case, if no measures are taken, the lubricating medium scooped up by the lowermost gear will flow into the lubricating medium storage portion without being carried by the gear train. As a result, the lubricating medium may not be sufficiently supplied to an element to be lubricated, or there may not be enough lubricating medium to be scooped up by the lowermost gear.

To address this, the vehicle power transmission device has the partition wall, which extends upward from the inner bottom of the case and surrounds a part of the outer periphery of the lowermost gear, on the center side of the case. The partition wall enables a sufficient amount of lubricating medium to be present around the lowermost gear. The partition wall also enables the lubricating medium scooped up by the lowermost gear to be directed to the gear train. As a result, a relatively large amount of lubricating medium can be guided to the lubrication flow path and supplied to a predetermined element to be lubricated. Accordingly, in a vehicle having this vehicle power transmission device mounted thereon, the wheel base can be easily extended and the predetermined element to be lubricated can be desirably lubricated even when the vehicle is towed during which the lubricating medium cannot be supplied to the element to be lubricated by using the lubricating pump.

According to an exemplary aspect of the invention, the partition wall may be formed to surround at least a lower half of the outer periphery of the lowermost gear on the center side of the case. This enables the lubricating medium scooped up by the lowermost gear to be desirably directed to the gear train.

According to an exemplary aspect of the invention, the gear train may include a topmost gear located at a highest position in the case among the gears included in the gear train when the power transmission device is mounted on the vehicle, and rotating in a same direction as that of the lowermost gear during normal rotation of the axle, and an intermediate gear provided between the lowermost gear and the topmost gear. An upper end of the partition wall may be positioned to guide the lubricating medium scooped up by the lowermost gear to a meshing part between the lowermost gear and the intermediate gear.

According to an exemplary aspect of the invention, an accommodating portion of the lowermost gear, which is defined by the inner bottom of the case and the partition wall, may communicate with the lubricating medium storage portion through a communicating path including a flow path extending along an axial direction of the lowermost gear. Since the communicating path that enables communication between the accommodating portion of the lowermost gear and the lubricating medium storage portion includes the flow path extending along the axial direction of the lowermost gear, the lubricating medium is less likely to flow between the accommodating portion of the lowermost gear and the lubricating medium storage portion, as compared to the case where the accommodating portion of the lowermost gear and the lubricating medium storage portion are communicated through an opening extending in the direction perpendicular to the axial direction of the lowermost gear. This structure therefore prevents an excessive amount of lubricating medium from flowing between the accommodating portion of the lowermost gear and the lubricating medium storage portion, whereby a more appropriate amount of lubricating medium can be stored in the accommodating portion of the lowermost gear and in the lubricating medium storage portion.

According to an exemplary aspect of the invention, in this vehicle power transmission device, the case may have a sidewall portion facing one side of the lowermost gear, the flow path included in the communicating path and extending along the axial direction may be a hole formed in the sidewall portion so as to extend in the axial direction, and a shielding member for preventing the lubricating medium from entering the hole from a direction along the axial direction of the lowermost gear may be fixed to the sidewall portion of the case. This structure enables a more appropriate amount of lubricating medium to flow between the accommodating portion of the lowermost gear and the lubricating medium storage portion, while preventing an excessive amount of lubricating medium from entering the accommodating portion of the lowermost gear from the lubricating medium storage portion in case of sudden braking of the vehicle and the like. As a result, a required and sufficient amount of lubricating medium can be stored in the accommodating portion of the lowermost gear while suppressing increase in stirring resistance resulting from an excessive amount of lubricating medium being stored in the accommodating portion.

According to an exemplary aspect of the invention, moreover, the vehicle power transmission device may further include a continuously variable transmission unit which is accommodated in the case and is capable of continuously shifting the power from the power generating source and transmitting the shifted power to the gear train. The vehicle may be a front-wheel drive vehicle, the lowermost gear may be a differential ring gear connected to a differential mechanism, and a primary shaft of the continuously variable transmission unit may be located rearward of the lowermost gear in a longitudinal direction of the vehicle when the power transmission device is mounted on the vehicle. In a front-wheel drive vehicle having this vehicle power transmission device mounted thereon, the wheel base can be easily extended and a predetermined element to be lubricated can be desirably lubricated even when the vehicle is towed during which the lubricating medium cannot be supplied to the element to be lubricated by using the lubricating pump.

According to an exemplary aspect of the invention, in this case, the vehicle power transmission device may further include a forward/backward travel switching unit, as an element to be lubricated, which is connected to the primary shaft of the continuously variable transmission unit and receives supply of the lubricating medium from the lubrication flow path. When a vehicle having the vehicle power transmission device including the continuously variable transmission unit is towed, generally, the primary shaft of the continuously variable transmission unit is brought into a so-called overdrive state with respect to the axle and rotates at a relatively high speed. It is therefore necessary to sufficiently lubricate the forward/backward travel switching unit connected to the primary shaft. Since the forward/backward travel switching unit is herein an element to be lubricated which receives supply of the lubricating medium from the lubrication flow path, towing of the vehicle having the vehicle power transmission device mounted thereon can be desirably performed.

What is claimed is:

1. A vehicle power transmission device mounted on a vehicle for transmitting power from a power generating source to an axle through a gear train accommodated in a case, comprising:
 a lubricating pump that is accommodated in the case and which is driven by the power generating source and is capable of supplying a lubricating medium to an element to be lubricated;
 a lubricating medium storage portion that stores the lubricating medium;
 an input shaft that receives power from the power generating source;
 a lowermost gear that is located at a lowest position in the case among gears included in the gear train when the power transmission device is mounted on the vehicle; and which scoops up the lubricating medium in an inner bottom of the case toward a center of the case during normal rotation of the axle without guiding the lubricating medium along an inner wall surface of the case;
 a partition wall that extends upward from the inner bottom of the case and surrounds a part of an outer periphery of the lowermost gear on a center side of the case, wherein a downstream end of the partition wall where the lubricating medium is scooped up is between the lowermost gear and the input shaft; and
 a lubrication flow path that guides the lubricating medium scooped up by the lowermost gear and carried by the gear train to a predetermined element to be lubricated.

2. The vehicle power transmission device according to claim 1, wherein the partition wall is formed so as to surround at least a lower half of the outer periphery of the lowermost gear on the center side of the case.

3. The vehicle power transmission device according to claim 2, wherein:
 the gear train includes a topmost gear located at a highest position in the case among the gears included in the gear train when the power transmission device is mounted on the vehicle, and rotating in a same direction as that of the lowermost gear during normal rotation of the axle, and an intermediate gear provided between the lowermost gear and the topmost gear, and
 an upper end of the partition wall is positioned so as to guide the lubricating medium scooped up by the lowermost gear to a meshing part between the lowermost gear and the intermediate gear.

4. The vehicle power transmission device according to claim 3, wherein an accommodating portion of the lowermost gear that is defined by the inner bottom of the case and the partition wall, communicates with the lubricating medium storage portion through a communicating path including a flow path extending along an axial direction of the lowermost gear.

5. The vehicle power transmission device according to claim 4, wherein:
 the case has a sidewall portion facing one side of the lowermost gear,
 the flow path included in the communicating path and extending along the axial direction is a hole formed in the sidewall portion so as to extend in the axial direction, and
 a shielding member that prevents the lubricating medium from entering the hole from a direction along the axial direction of the lowermost gear is fixed to the sidewall portion of the case.

6. The vehicle power transmission device according to claim 5, further comprising:
 a continuously variable transmission unit that is accommodated in the case and is capable of continuously shifting the power from the power generating source and transmitting the shifted power to the gear train,
 wherein the vehicle is a front-wheel drive vehicle, the lowermost gear is a differential ring gear connected to a differential mechanism, and a primary shaft of the continuously variable transmission unit is located rearward of the lowermost gear in a longitudinal direction of the vehicle when the power transmission device is mounted on the vehicle.

7. The vehicle power transmission device according to claim 5, wherein the shielding member and a slit are formed on a plate by bending a portion inside a cut such that a portion inside the cut is recessed with respect to a surrounding portion in a substantially U-shape or C-shape, and the plate is fixed to the sidewall portion of the case.

8. The vehicle power transmission device according to claim 1, wherein:
 the gear train includes a topmost gear located at a highest position in the case among the gears included in the gear train when the power transmission device is mounted on the vehicle, and rotating in a same direction as that of the lowermost gear during normal rotation of the axle, and an intermediate gear provided between the lowermost gear and the topmost gear, and
 an upper end of the partition wall is positioned so as to guide the lubricating medium scooped up by the lowermost gear to a meshing part between the lowermost gear and the intermediate gear.

9. The vehicle power transmission device according to claim 1, wherein an accommodating portion of the lowermost gear that is defined by the inner bottom of the case and the partition wall, communicates with the lubricating medium storage portion through a communicating path including a flow path extending along an axial direction of the lowermost gear.

10. The vehicle power transmission device according to claim 9, wherein:
 the case has a sidewall portion facing one side of the lowermost gear,
 the flow path included in the communicating path and extending along the axial direction is a hole formed in the sidewall portion so as to extend in the axial direction, and
 a shielding member that prevents the lubricating medium from entering the hole from a direction along the axial direction of the lowermost gear is fixed to the sidewall portion of the case.

11. The vehicle power transmission device according to claim 10, further comprising:
 a continuously variable transmission unit that is accommodated in the case and is capable of continuously shifting the power from the power generating source and transmitting the shifted power to the gear train,
 wherein the vehicle is a front-wheel drive vehicle, the lowermost gear is a differential ring gear connected to a differential mechanism, and a primary shaft of the continuously variable transmission unit is located rearward of the lowermost gear in a longitudinal direction of the vehicle when the power transmission device is mounted on the vehicle.

12. The vehicle power transmission device according to claim 10, wherein the shielding member and a slit are formed on a plate by bending a portion inside a cut such that a portion inside the cut is recessed with respect to a surrounding portion in a substantially U-shape or C-shape, and the plate is fixed to the sidewall portion of the case.

13. The vehicle power transmission device according to claim 11, further comprising:
a forward/backward travel switching unit, is an element to be lubricated, which is connected to the primary shaft of the continuously variable transmission unit and receives supply of the lubricating medium from the lubrication flow path.

14. The vehicle power transmission device according to claim 1, further comprising:
a continuously variable transmission unit that is accommodated in the case and is capable of continuously shifting the power from the power generating source and transmitting the shifted power to the gear train,
wherein the vehicle is a front-wheel drive vehicle, the lowermost gear is a differential ring gear connected to a differential mechanism, and a primary shaft of the continuously variable transmission unit is located rearward of the lowermost gear in a longitudinal direction of the vehicle when the power transmission device is mounted on the vehicle.

15. The vehicle power transmission device according to claim 14, further comprising:
a forward/backward travel switching unit, is an element to be lubricated, which is connected to the primary shaft of the continuously variable transmission unit and receives supply of the lubricating medium from the lubrication flow path.

* * * * *

UNITED STATES PATENT AND TRADEMARK OFFICE
CERTIFICATE OF CORRECTION

| | |
|---|---|
| PATENT NO. | : 8,328,668 B2 |
| APPLICATION NO. | : 12/318225 |
| DATED | : December 11, 2012 |
| INVENTOR(S) | : Michihiro Ariga et al. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 671 days.

Signed and Sealed this
Eighteenth Day of November, 2014

Michelle K. Lee
*Deputy Director of the United States Patent and Trademark Office*